Figure 1:
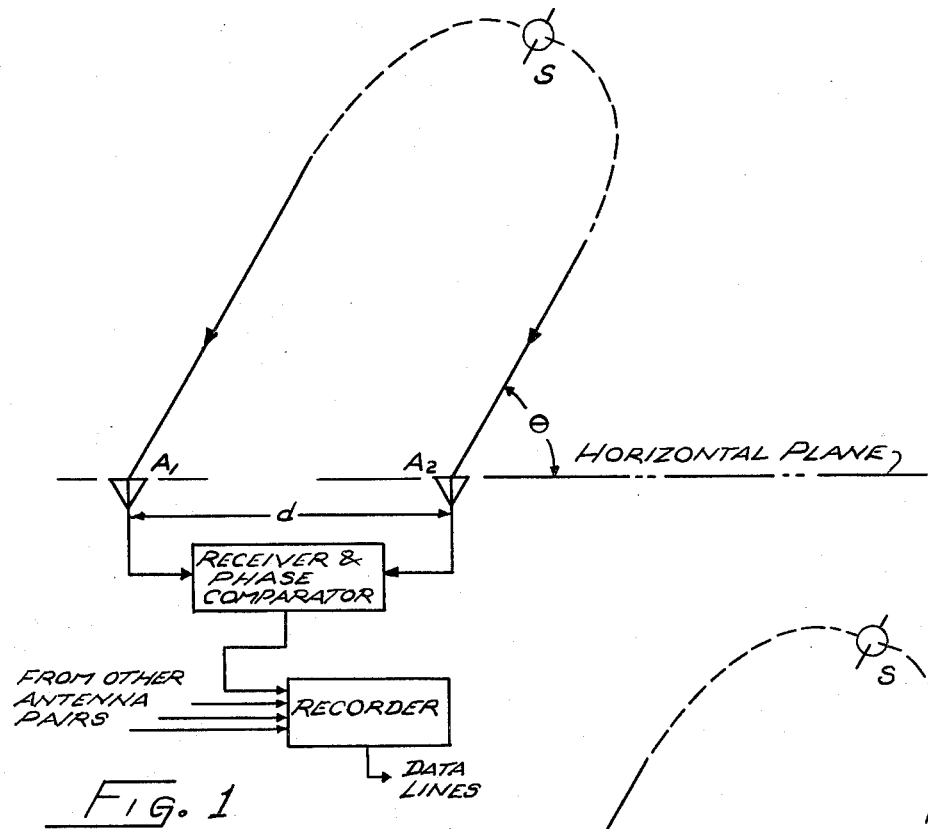

March 17, 1964 M. G. KAUFMAN ETAL 3,125,756
SATELLITE TRACKING BY SIMULATOR COMPARISON
Filed Nov. 19, 1959 4 Sheets-Sheet 1

INVENTORS
Maxime G. Kaufman
Leonard O. Hayden
BY
ATTORNEY

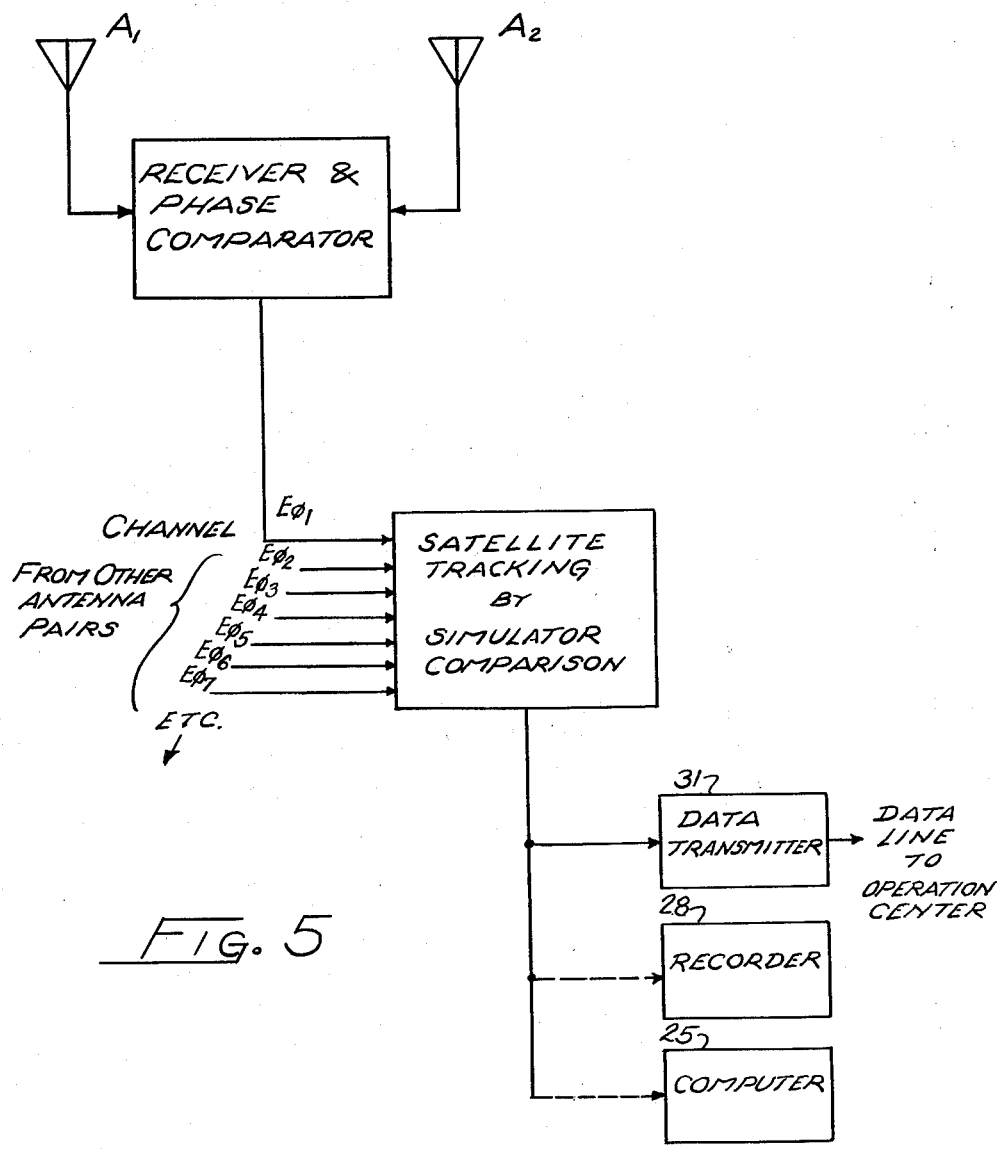

United States Patent Office 3,125,756
Patented Mar. 17, 1964

3,125,756
SATELLITE TRACKING BY SIMULATOR
COMPARISON
Maxime G. Kaufman, 5706 Joyce Drive, Washington 22, D.C., and Leonard O. Hayden, Rte. 1, Box 158, Accokeek, Md.
Filed Nov. 19, 1959, Ser. No. 854,072
16 Claims. (Cl. 343—113)

This invention is used in conjunction with a radio interferometer system for detecting and determining the angular coordinates of such things as artificial satellites, cosmic noise and meteors. The invention works with passive as well as active radio interferometer systems. The invention pertains to a new method of automatically resolving the angle of arrival of radio signals received from space. It is directed toward eliminating the tedious human labor previously required in reading complex records to determine the angle of arrival of signals from space. It also reduces the number of communication channels required to transmit the data obtained from the radio interferometer receiving site to the data processing center.

In practice, a radio interferometer detection system will have several signal outputs, each of which has to be analyzed individually to accurately determine the angle of arrival of the radio signal. This invention monitors the various signal outputs and automatically renders an output which corresponds to the angle of arrival of these signals.

Previous to this invention the information in each channel was recorded on a continuous paper strip and the data was analyzed by visual aids and special mechanical slide rules. This resulted in a considerable loss of time and effort to determine the angle of arrival of these signals. This time loss could result in a serious situation, should the satellite's position have special scientific value requiring that its coordinates be known immediately.

Several objects of the invention are:
(1) To provide means for atuomatically processing several channels of interferometer signal data into one resultant angle of arrival.
(2) To effect the process, as in 1 above, in real time, instead of the previously used method involving human beings to make calculations.
(3) To provide means for increasing the efficiency of operations by reducing the number of recorders needed at the sites and the number of commercial data-lines needed from the receiving sites to the data processing center.
(4) To provide means for a direct automatic conversion of signal data to a computer and eliminate intermediate analysis by human beings.
(5) To provide means for a real time visual display of the signal's angle of arrival.

The invention has many advantages over prior art in the following respects:
(1) It is automatic.
(2) It indicates the signal's angle of arrival in real time.
(3) It makes the operations more economical.
(4) It provides a visual readout.
(5) It reduces the number of data channels for transmission of angle data to a distant data processing center.
(6) It is directly adaptable to a computer.
(7) It is not limited to the number of channels which it can monitor.
(8) It provides both digital and analog outputs.

Figure 2:
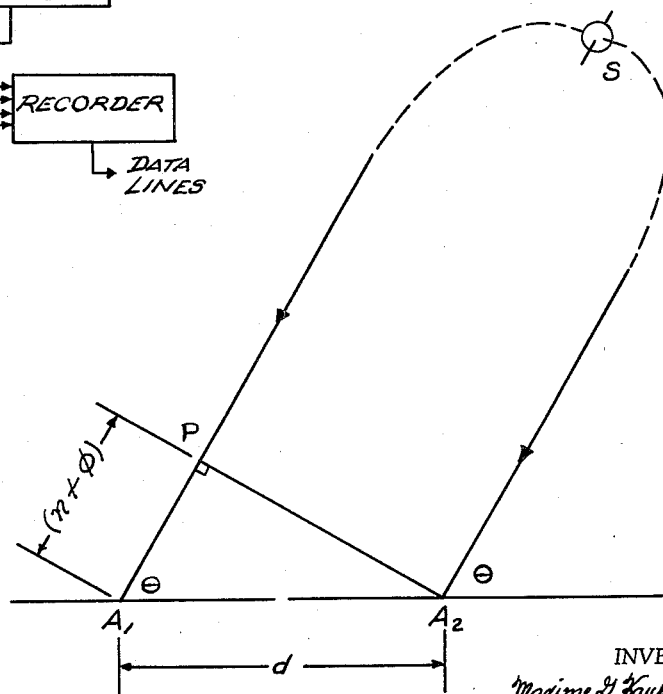
Figure 3:
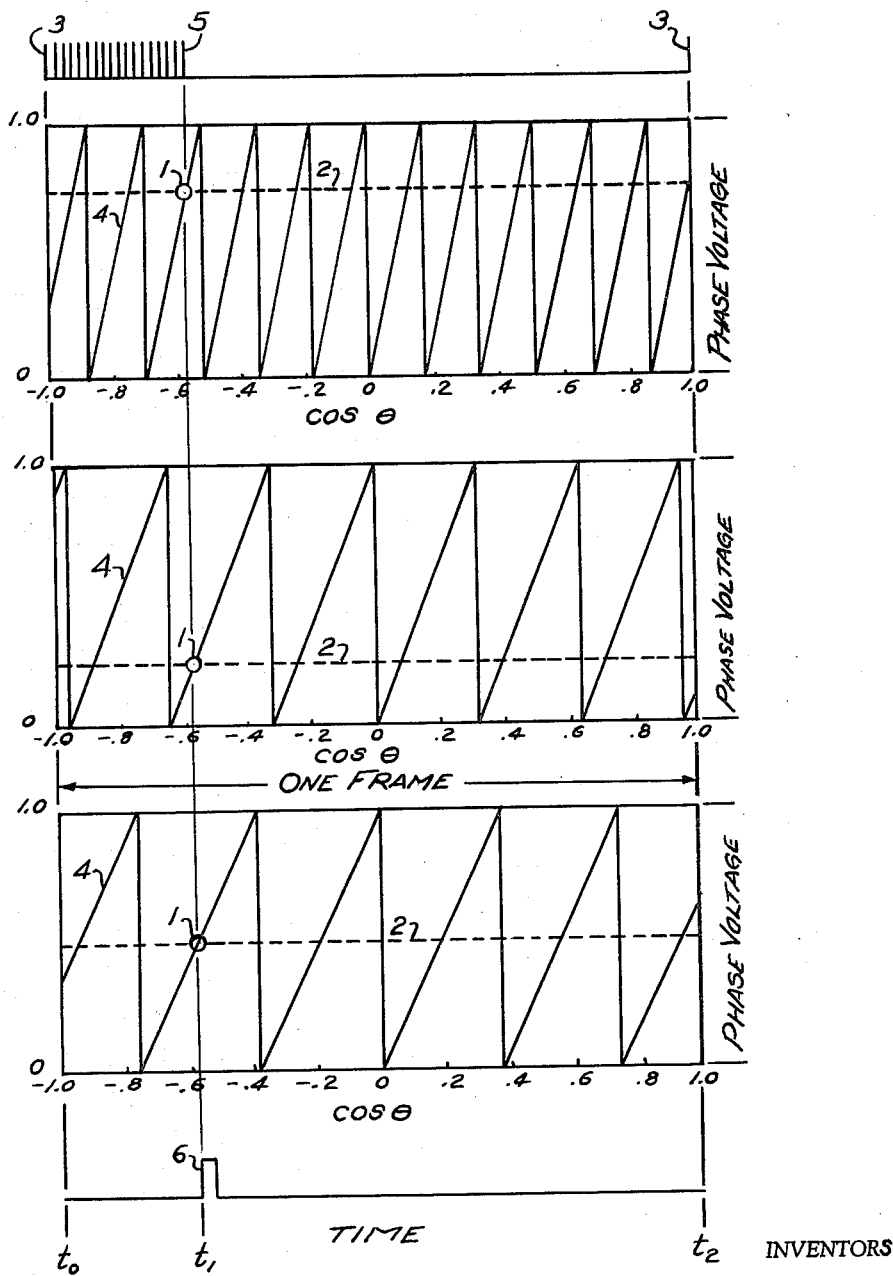
Figure 4:
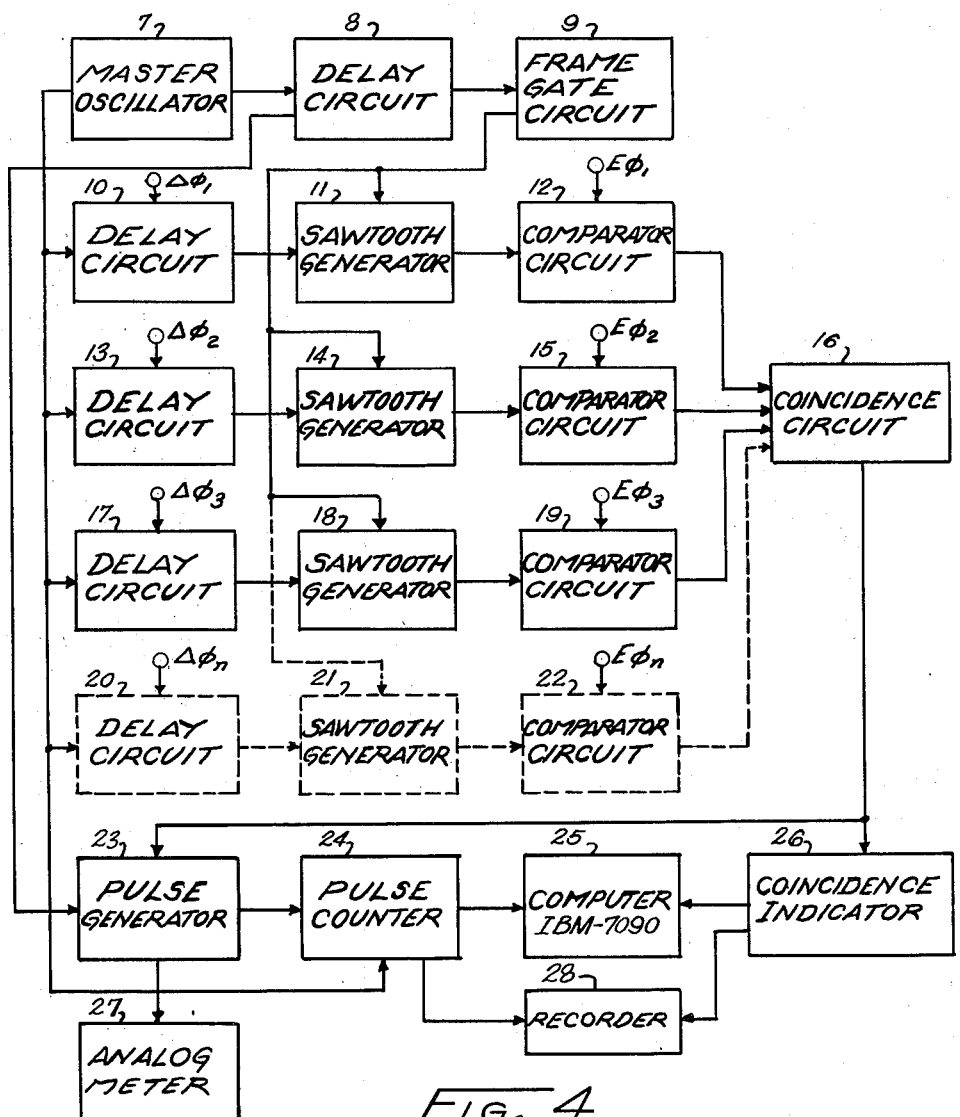

The foregoing discussion can be further explained upon reference to the following description, when read in connection with the accompanying drawings, in which:
FIGURE 1 illustrates the basic interferometer system.
FIGURE 2 illustrates the geometry of the situation.
FIGURE 3 illustrates several signal waveforms.
FIGURE 4 shows a block diagram for instrumenting the invention.
FIGURE 5 shows a block diagram illustrating the relationship of the invention with the interferometer system.

A brief description of the interferometer detecting system follows in order to more clearly explain how the invention applies to it. The basic apparatus required to instrument the interferometer principle is shown in FIGURE 1. The two antenna arrays are separated by a known distance (hereinafter referred to as a baseline) and are connected through equal length of transmission line to a phase comparator. The phase comparator renders a voltage output which is a linear function of phase difference for phase differences between 0 and 360 degrees. The combination shown in FIGURE 1 is sufficient to give a phase voltage output which depends upon the angle of arrival of signals from a source located in space. This output is a multivalued function of the angle of arrival except in the special case where the baseline is less than one-half wavelength. The wavelength referred to is that associated with the frequency of the radio signals involved. Baselines greater than one-half wavelength are necessary in a practical system, since the resolution of the signal arrival angle is directly proportional to the length of the baseline. Therefore special techniques must be used to eliminate the ambiguities resulting from the multivalued character of the phase voltage function. These techniques will be explained later. The theory of the interferometer's operation is as follows:

The geometry of the situation is shown in FIGURE 2. Normally the source S is at a distance which is great compared with the separation between the antennas. Therefore for all practical purposes lines $SA_1$ and $SA_2$ will be parallel. Also $A_2P$ can be drawn perpendicular to $SA_2$. The phase difference that will be read by the receiving system shown in FIGURE 1, will be proportional to the distance $PA_1$ measured in degrees. The angle of arrival of the radio signal is given by the equation:

$$\text{cosine } \theta = \frac{PA_1}{A_1A_2}$$

where $A_1A_2$ represents the baseline distance between the pair of antennas. The distance $PA_1$ will be an integral number of wavelengths in addition to a fractional part thereof represented in FIGURE 2 by $(n+\phi)$, where $n$ is the integral part and $\phi$ the fractional part. The signal output from the receiver phase comparator will be a voltage, linearly proportional to the magnitude of the fractional part.

If one considers all the values of cosine $\theta$ from one horizon to the opposite, a graph of the outputs from three phase comparators is obtained as shown in FIGURE 3. The waveforms of FIGURE 3 are presented as electrical phase ranging from 0 to 360 degrees but normalized to unity and plotted against cosine $\theta$, where $\theta$ is the angle subtended by one horizon and the angle of arrival. This angle can vary 180 degrees or, what is equivalent, the cosine can vary from plus one to minus one. It is noted from FIGURE 3, the particular interferometer's phase sensing electronics being considered generates a sawtooth waveform.

In any practical system there is a limit to the accuracy with which phase can be measured. The effect of this error is inversely proportional to the length of the baseline. This necessitates the use of long baselines to minimize the effect of this error. Since the long baseline gives a multivalued function, it is necessary to use a set of baselines of scaled lengths such that the error in each smaller length is sufficiently small to uniquely identify the signal in the next longer baseline and so on. Resolution of the initial baseline may be accomplished by starting with a baseline less than one-half wavelength long and progressing to longer ones. An alternative procedure is to use two baselines whose difference in length is less than one-half wavelength. The net effect of these measures is to have a set of several antennas, each pair supplying a phase voltage that renders the next longest baseline unambiguous and can be used to locate the signal in the longest baseline, or the most accurate one. This technique is very useful especially if there is noise on the signal which tends to mask its exact location.

The essence of the invention can be conveniently stated at this point in the explanation. Since the output signal of the interferometer is a known function of the angle of arrival, it is logical to generate simulated waveforms in which time is introduced as a parameter and compare these waveforms with the incoming signal phase voltages. The incoming phase voltages, which are a function of the angle of arrival, are compared electronically with the simulated voltages which depend on the parameter $t$. When this set of voltages equals the simulated set the value of $t$ is measured electronically. Since $t$ is implicitly a function of angle of arrival its value can be interpreted automatically as the value of the angle of arrival. This value is read out by suitable electronic means.

Before going into the explanation of the apparatus required to instrument the invention, attention is again directed to FIGURE 3, wherein several typical waveforms are shown. These waveforms represent both live signal waveforms and the simulated waveforms with the variable $t$ substituted for cosine $\theta$. T is introduced in such a way that cosine $\theta$ equals $Kt$ (K is a constant). Hence a set of corresponding simulated waveforms have the same relative slopes as the set with cosine $\theta$ as a variable.

Since the choice of K is not restricted in any way, it can be so chosen that the whole pattern can be swept in as short a time as desired. This provides the possibility of comparing all possible angles of arrival in an arbitrarily short time. This permits points in the angle of arrival time-function to be measured at very short time increments and in effect provides an essentially continuous monitoring of the angle of arrival of the signals as long as such signals can be received. This electronic generation of simulated signal waveforms and the comparing of these to the incoming signal, can be done in a frame sweeping technique. Thus all channels of incoming signals are scrutinized simultaneously. The frame sweeping technique has several advantages in that:

(1) The frame rate can be set to a high speed compared to the variation of the received signal, thus the received signal will be tested for coincidency with the simulated waveform many times, essentially rendering a continuous monitored record of the signal's angle of arrival.

(2) It is not necessary to deduce a one-half wavelength baseline explicitly as the electronic technique contained herein automatically checks and rejects erroneous possibilities.

The waveform for the shorter baseline is shown at the bottom of FIGURE 3, the two waveforms above represent successively longer baselines, as indicated by the larger number of complete cycles of phase variations. At the top of FIGURE 3 is shown a pulse series 3. This represents the pulses that are counted as they are generated from the pulse generator which has been set off by the start of the sawtooth frame at time $t_0$. This pulse count is proportional to the cosine of the geometric space angle of the signal from the satellite, or other source of signal, as the case may be. The pulse series 3 will run on out to the end of the frame to $t_2$, if no phase signals are being received.

Now consider for example, phase signal voltages arriving from a set of three antennas at the same moment in time, $t_1$. These signals are represented by horizontal dashed lines 2 on FIGURE 3 because these phase voltages have no appreciable change during the time it takes for one sweep of the reference voltages. The circles 1 represent points at which the reference voltages are equal to the live phase voltages in all channels. This determines the angle of arrival of the signal as follows: The phase voltages for the three channels have been compared in coincidence circuits with the simulated phase voltages and overall coincidence, triple coincidence in this case, stops the pulse-series 3 count at the pulse marked 5, shown on the top of FIGURE 3. This is done by an overall coincidence pulse 6, that is generated by a coincidence generator, when each of the live signals is in voltage and time coincidence with their respective simulated sawtooth waveforms 4.

The unique feature of the coincidence points, circles 1, is that they can only occur simultaneously at one discrete interval of time. This is due to the fact that the baselines have been made the proper lengths to resolve the ambiguity of long baselines as explained previously.

The number of pulses generated from time $t_0$ to $t_1$ stay registered on a visual counter indicating the angle until cleared by the end of the frame time $t_2$. For a fast frame time the integration effect holds the count. This count gradually changes as the object in space passes the receiving site. There is no counting action during the end of frame flyback time. The reason for this is that the pulse series 3 is not operative during the frame flyback time, since it is triggered by the frame starting time and turned off at the end of the frame. The sawtooth falltime does not register because the coincidence circuits do not respond to it. The pulse series 3 is set to a value high enough to give angular resolution comparable to the resolution capability of the longest baseline channel in the interferometer system. For example, the pulse rate can be set to 100,000 pulses per second. This gives a coded readout of the cosine of the angle of arrival to six places. This coded readout is linear in respect to the cosine so that 000,000 represents minus 1, (180°); 50,000 represents 0 (90°) and 100,000 represents plus 1 equivalent to 0 degrees. On the other hand, one may wish to convert this linear pulse series to the space angle by feeding it to a converter circuit which would indicate proportional to the arc-cosine.

Having thus described the principle of the invention, the following discussion will explain the logic diagram shown in FIGURE 4, wherein the circuitry of the individual blocks is well known to the art.

Starting at the upper left hand corner of FIGURE 4 there is the Master Oscillator 7 which is used to synchronize the three Sawtooth Generators 11, 14 and 18 in parallel, thus generating a frame of these sawtooth waveforms. Between the Master Oscillator circuit 7 and each sawtooth generator is a separate Delay Circuit 10, 13 and 17, which is used to adjust the starting time of each simulated waveform. The frame generation action is repetitive and is repeated continuously. The frequency of the Master Oscillator 7 may be any convenient value, say 100 cycles per second. It is noted that the Master Oscillator 7 also turns on the Pulse Generator 23 at the beginning of each frame. This is also done through a Delay Circuit 8, so as to have the Pulse Series 3 on FIGURE 3 start at the proper time. The Pulse Generator 23 continues to produce a series of pulses at its output until the end of the frame time, or when it receives a stop-pulse from the Coincidence Circuit 16, which ever occurs first.

Each one of the Sawtooth Generators 11, 14 and 18 feeds a separate Voltage Comparactor circuit 12, 15 and 19. Also feeding each one of the Voltage Comparator circuits 12, 15 and 19 are the live phase angle signals $E_{\phi 1}$, $E_{\phi 2}$ and $E_{\phi 3}$. Whenever there is a coincidence between the voltage level of a sawtooth waveform and a live phase angle signal voltage level, a pulse is formed at the output of each Voltage Comparator circuits 12, 15 and 19 respectively. These pulses are fed to the Coincidence Circuit 16. A pulse will emit from the Coincidence Circuit 16, only when there is triple coincidence of the three pulses from the Voltage Comparator circuits 12, 15 and 19. The so generated pulse from the Coincidence Circuit 16 will travel to the Pulse Generator 23 and turn it off.

The Pulse Generator 23 output is fed to a Pulse Counter circuit 24 which indicates a count that is a function of the angle of arrival of the signal. The Pulse Counter 24 is connected to a Computer 25, (similar to IBM 7090) where the count representing the angle of arrival can be used for further analytical purposes, such as calculating prediction times, or orbits. It is noted that the Pulse Counter 24 is fed to a Recorder 28, and the Pulse Generator 23 is fed to an analog device such as a Meter 27, for storage and display purposes.

The blocks shown dotted in FIGURE 4 are to indicate that more channels can be added in a similar fashion. The sequence of operations will be the same as described above, using the added blocks 20, 21 and 22, a Delay Circuit, a Sawtooth Generator and a Comparator Circuit respectively. The live signal to the voltage comparator circuit in this case is indicated as $E_{\phi n}$. The Indicator 26 is used to monitor the action of the Coincidence Circuit 16. It blocks the Computer 25 and the Recorder 28 when no coincidence occurs.

The pulse formed by the Voltage Comparator circuits, when there is a coincidence between the live signal and the simulated waveform, have a tailored width proportional to the baseline involved. Each pulse so formed from each of the corresponding Voltage Comparator circuits will enter the Coincidence circuit where an automatic test is made for overall coincidency. By having the pulse widths inversely proportional to the baselines, the probability of overall coincidency is enhanced. This does not effect the resolution of the system, since this is determined by the choice of the pulse width associated with the longest baseline alone. However each of the pulse width under discussion should be less than a period of the sawtooth waveform of the channel being considered, so that ambiguity will not be built into the operation.

The inputs on the Delay Circuits 10, 13, 17 and 20 are incremental phase voltages $\Delta_{\phi 1}$, $\Delta_{\phi 2}$, $\Delta_{\phi 3}$, $\Delta_{\phi n}$. These are obtained from each of the channels of the basic interferometer system and represent the amount of phase shift needed in each channel of the invention apparatus to keep the channel in calibration. These phase corrections can be inserted into each Delay Circuit by individual servo techniques or set in manually with a bias voltage across a potentiometer or the like. The effect of these inputs is to set the time of each sawtooth waveform in proper time relationship so that the Frame Gate 9 unblanks the frame of sawtooth waveforms at their proper starting points on their individual sweeps. This proper starting point not only includes the basic interferometer phase relationships between the sawtooth waveforms but also any shift required to compensate for phase drift errors involved in a practical application.

Since any practical set up of large antenna arrays for a radio interferometer detecting system cannot be constructed to have their electrical centers fall exactly on their geometric centers, it is also convenient to adjust $\Delta_{\phi 1}$, $\Delta_{\phi 2}$, $\Delta_{\phi 3}$ and $\Delta_{\phi n}$ to compensate for this situation.

FIGURE 5 shows the complete system in accordance with the invention. Block 29, represents a basic interferometer receiver with a phase comparator fed by an antenna pair, the output of which enters block 30 as channel $E_{\phi 1}$. Similar inputs constitute the other channels shown as $E_{\phi 2}$, $E_{\phi 3}$, $E_{\phi 4}$, $E_{\phi 5}$, etc. The channels are combined in block 30, which represents the invention.

The output of block 30 which is the resultant of all input channels, is shown feeding the Data Transmitter 31, the Recorder 28, and the Computer 25.

The invention can be applied to any basic interferometer utilizing the medium of electromagnetic waves, and can be adapted to work with sound waves.

Having thus described our invention, we claim:

1. In a radio interferometer system the apparatus for determining the angle of arrival of the received signals from a plurality of channels of the interferometer the combination comprising a master oscillator parallel connected to a pulse generator and a frame gate circuit through a common delay circuit, and a plurality of sawtooth generators through separate delay circuits, said separate delay circuits being parallel connected to said master oscillator, said pulse generator parallel connected to a pulse counter and an analog meter, said pulse counter parallel connected to a computer and a recorder said sawtooth generators individually connected to comparator circuits said comparator circuits individually coupled to separate signal output terminals of the radio interferometer, said comparator circuits parallel coupled to a coincidence circuit, and said coincidence circuit coupled to an indicating circuit to control the analog readout of the angle of arrival of the radio waves.

2. In a radio interferometer system the apparatus for automatically determining the angle of arrival of the received sawtooth waveform signals from a plurality of signal output channels of the interferometer, the combination comprising a master oscillator parallel connected to a pulse generator, a frame gate generator and a plurality of sawtooth generators through separate delay circuits, said pulse generator parallel connected to an analog meter and a pulse counter, said pulse counter parallel connected to a computer and a recorder, a coincidence indicator parallel connected to said computer and said recorder, said sawtooth generators individually connected to separate comparator circuits, a plurality of output terminals from the radio interferometer connected, one to each of the corresponding said comparator circuits, a coincidence circuit parallel connected to said comparator circuits, and said coincidence circuit parallel connected to said pulse generator and said coincidence indicator.

3. In a system for combining a plurality of output signals from a radio interferometer, said output signals having several ambiguities in representing the angle-of-arrival of the radio waves, when taken individually, into an unambiguous signal representing the angle-of-arrival of the radio waves, the combination of a common delay circuit, having means for adjusting the delay thereof, a frame gate circuit and a pulse generator both connected to said common delay circuit, having means for adjusting the frame gate waveform and means for adjusting the frequency of the pulse generator, a plurality of sawtooth generators connected individually to separate delay circuits, having means for adjusting the periods and amplitudes of the sawtooth generators and means for adjusting the delay of each delay circuit, an oscillator connected to said common delay circuit for synchronizing said frame gate circuit and said pulse generator, a pulse counter connected to said pulse generator, said plurality of sawtooth generator circuits connected to said oscillator through said separate delay circuits, said oscillator having means for adjusting the frequency thereof, a plurality of comparator circuits, equal in number to the number of sawtooth generators, one comparator circuit connected to each sawtooth generator, a plurality of output terminals from the radio interferometer, each connected to a separate one of the said comparator circuits, a coincidence circuit parallel connected to the plurality of said comparator circuits, said coincidence circuit connected to said pulse generator, said coincidence circuit's output used to stop the pulse generator, a pulse counter connected to said pulse generator to provide a digital readout of the angle-of-arrival of the radio waves, an analog meter connected to said pulse generator to provide a voltage analog of the angle of arrival of the radio waves, 4. In a radio interferometer system for measuring the angle of arrival of radio waves having a plurality of separate output signals which vary in the degree of accuracy of angle measurement obtainable from each, the method of combining said plurality of output signals into a single output of signal whose accuracy corresponds with the resolution of the output signal from the longest baseline involved in the interferometer system, said single signal output to effectively combine the plurality of separate output signals simultaneously in substantially real time, comprising the steps of generating a plurality of voltage waveforms, hereinafter designated as simulated waveforms, representing all possible values of those expected to appear at the plurality of outputs of the radio interferometer, arranging said waveforms into a frame sweeping said frame rapidly, with respect to the rate of change of the signals, across the output signals of the radio interferometer, comparing said simulated waveforms with the signal voltage waveforms, generating coincidence indications at the time each simulated waveform substantially equals its corresponding signal waveform, generating an overall coincidence indication when all of said simulated waveforms are substantially coincident with all of the signal waveforms, generating an analog voltage waveform representing the gamut of all possible angles of arrival of the radio waves for readout means, starting said angle analog voltage generator with the start of said frame, and stopping said angle analog voltage generator with said overall coincidence indication, and generating a substantially stable frequency voltage waveform for synchronization, synchronizing the above system at a rate that yields said angle analog readout in substantially real time.

5. In an interferometer system employing a plurality of baselines many wavelengths long, apparatus for automatically resolving the angle of arrival of a wave energy signal comprising the combination of a master oscillator parallel connected to a pulse generator and a frame gate circuit through a common delay circuit, and a plurality of sawtooth generators connected to said oscillator through separate delay circuits, said pulse generator parallel connected to a pulse counter and an analog meter for readout indications, said sawtooth generators individually connected to comparator circuits said comparator circuits individually coupled to separate signal output terminals of a radio interferometer said comparator circuits parallel coupled to a coincidence circuit, and said coincidence circuit coupled to said pulse generator indicating circuitry to control the analog readout of the angle of arrival of the radio waves.

6. In an interferometer system the method of resolving the angle of arrival of waves comprising the steps of generating a plurality of varying voltages, the combination periodically varying to include the range of signal voltages to be expected from the interferometer system and arranged so that any unique combination of voltages occurs only once during a period, and comparing the said generated voltages with the output signal voltages of the interferometer system.

7. In an interferometer system the method of resolving the angle of arrival of electromagnetic or sound signal waves comprising the steps of generating a plurality of varying waves, the combination periodically varying to include the range of signal waves expected from the interferometer system and arranged so that any unique combination of waves occurs only once during a period, the sweeping of said generated waves across the signal waves, the comparing of the said generated waves with said signal waves, the generation of a coincidence indication between said generated and signal waves, the generation of a wave that represents the angle of arrival of the signal waves, and the controlling of said angle of arrival wave by the said coincidence indication.

8. In a radio interferometer system the method of resolving the angle of arrival of waves comprising the steps of generating a plurality of varying voltages, the combination periodically varying to include the range of signal voltages to be expected from the radio interferometer system and arranged so that any unique combination of voltages occurs only once during a period, and comparing said generated voltages with the output signal voltages of the interferometer system.

9. In a radio interferometer system the method of resolving the angle of arrival of waves comprising the steps of generating a plurality of varying voltages, the combination periodically varying to include the range of signal voltages to be expected from the radio interferometer system and arranged so that any unique combination of voltages occurs only once during a period, the sweeping of said generated voltages across the signal voltages, the comparing of the said generated voltages with the signal voltages, the generation of a coincidence indicating voltage pulse between said generated and signal voltages, the generation of a voltage that represents the angle of arrival of the signal voltage, and the controlling of said angle of arrival voltage by the said coincidence indicating voltage pulse.

10. A system for automatically determining the angle of arrival of radio interferometer signals comprising means for connecting a plurality of said radio interferometer signals to individual comparator circuits, means for locally generating a plurality of reference signals, means for connecting said reference signals individually to said comparators, a coincidence circuit, means for connecting the outputs of said comparator circuits to said coincidence circuit, means for generating a master reference signal, means for measuring the phase relationship between said coincidence circuit output and said master reference signal.

11. A system which operates in real time for automatically resolving the angle of arrival of signals detected by a multi-baseline radio interferometer comprising means for generating a plurality of reference voltage waveforms, means for comparing said reference voltage waveforms to signals from the radio interferometer, means for generating a coincidence indication voltage waveform when all reference voltage waveforms and interferometer signal waveforms correlate in time and amplitude, means for measuring the phase relationship between two voltage waveforms, means for generating a master reference voltage waveform, means for coupling said coincidence indication generator means and said master reference voltage generator means to said phase measuring means, means for recording the voltage output of said phase measuring means, said voltage output being the electrical analog of the angle of arrival of the signals detected by the radio interferometer, coupling means between said phase measuring means and said recording means.

12. Apparatus for automatically combining a plurality of radio interferometer output signals, which are individually ambiguous in representing the the angle of arrival of the radio waves, into one unambiguous signal indicating said angle of arrival, comprising the combination of a master oscillator connected to a plurality of delay circuits and to a pulse counter, the first delay circuit of said plurality of delay circuits connected to a frame gate circuit and to a pulse generator circuit, each of the remaining said delay circuits connected to separate sawtooth voltage generators, each said sawtooth voltage generator connected to individual comparator circuits, each of said comparator circuits having an interferometer signal input terminal, there being enough reiterative components to accept all of the interferometer signals, parallel connections from each of said comparator circuits to a coincidence circuit, a connection from said frame gate circuit to each of said sawtooth voltage generators, a coincidence indicator connected to said coincidence circuit, said coincidence indicator connected to a recorder, a computer connected between said pulse generator and said coincidence indicator, said pulse counter connected to said recorder, and said pulse generator connected to an analog meter.

13. In a radio interferometer system the system for determining the angle of arrival of the received signals from a plurality of output channels of the radio interferometer comprising the combination of means for synchronizing some of the following components as henceforth indicated,
   means for generating a plurality of varying voltages, the combination periodically varying to include the range of voltages to be expected from the interferometer system, synchronized by said synchronizing means, and arranged so that any unique combination of voltage occurs only once during a period, each of the said varying voltages corresponding to each of the signals from the output channels of the radio interferometer,
   means for maintaining phase coherency between said varying voltages,
   means for comparing each of said varying voltages to a corresponding output signal voltage of the radio interferometer,
   means for generating a first individual coincidence voltage pulse when said varying voltage is substantially equal in time and amplitude to the corresponding output signal voltage of the radio interferometer,
   means for generating a second overall coincidence voltage pulse when said first individual coincidence voltage pulses of all channels are all enabled,
   means for generating an analog signal representing all possible angles of arrival of the radio waves,
   means for starting said analog signal in step with said synchronizing means,
   means for stopping said analog signal generation in step with said second overall coincidence voltage pulse,
   means for generating a visual display of said analog signal,
   means for generating a digital signal output of said angle of arrival,
   means for connecting said digital signal output to a computer for orbital calculations,
   means for controlling the period of enabling said visual display,
   and means for controlling the period of enabling said digital signal.

14. Apparatus for measuring the phase difference between a first and second alternating voltage comprising, in combination,
   first and second voltage waveform generators whose waveforms are preset in their phase relationship to each other,
   a first voltage comparator circuit,
   means for connecting said first alternating voltage and said first voltage waveform generator to said first voltage comparator circuit,
   a second voltage comparator circuit,
   means for connecting said second alternating voltage and said second voltage waveform generator to said second voltage comparator circuit,
   a voltage coincidence circuit,
   means for connecting said first and second voltage comparator circuits to said voltage coincidence circuit,
   a phase indicator circuit,
   means for connecting said coincidence circuit to said indicator circuit,
   a stable frequency voltage oscillator circuit, and
   means for connecting said stable frequency voltage oscillator to said voltage waveform generators for synchronization and to said indicator circuit for reference.

15. An automatic signal combining arrangement for a radio interferometer system, said radio interferometer system involving several baselines and therefore several signal outputs, the phase relationship between pairs of said signal outputs indicating the angle-of-arrival of the radio energy with varying accuracy, said accuracy increasing with baseline length but becoming more ambiguous, comprising
   means for producing and synchronizing a plurality of locally generated voltage waveforms, each tailored to simulate the predetermined voltage waveshape of each output signal voltage waveform from the multichannel radio interferometer system and each generated voltage waveform phased locked to the other generated voltage waveforms in a predetermined definite pattern which also simulate the phase relationships between the output signal voltage waveforms, said locally generated voltage waveforms hereinafter referred to as—simulated voltage waveforms—,
   means for individually comparing and indicating coincidence between each said simulated voltage waveform and each corresponding received output signal voltage waveform,
   means for determining when all of said simulated voltage waveforms are coincident with all of the output signal waveforms, pair by pair,
   means for generating an electrical analog of the angle-of-arrival which is responsive to said synchronizing means and to said overall coincidence means.

16. In a multi-channel radio interferometer system for measuring the signal angle-of-arrival, a channel combining system comprising
   means for producing a plurality of varying voltages, the combination periodically varying to include the range of signal voltages expected from the interferometer system and arranged in amplitude and time-phase so that any unique combination of voltages occurs only once during a frame, said frame of voltages repeating at a period which is high compared to the rate of change of the signals,
   means for generating a voltage oscillation of stable frequency
   means for synchronizing said frame to said stable frequency oscillator
   means for individually comparing said varying voltages to the received signal voltages,
   means for sensing amplitude and time-phase correlation between said signal voltages and said varying voltages,
   means for generating a train of pulses of high repetition rate compared to the frame rate and commensurate with the accuracy of resolution of the readout desirable, means for initiating said pulse train coincident with the start of said frame, means for stopping said pulse train coincident with said sensing means means for counting the pulses of said pulse train means for computing, and means for connecting said pulse train counting means to said computer means.

References Cited in the file of this patent

UNITED STATES PATENTS

| | | |
|---|---|---|
| 2,701,875 | Baltzer | Feb. 8, 1955 |
| 2,943,322 | Asbury | June 28, 1960 |

OTHER REFERENCES

I.R.E. Transactions on Instrumentation, vol I-6, No. 1, March 1957, pp. 12-17.